(12) United States Patent
Park et al.

(10) Patent No.: US 7,554,891 B2
(45) Date of Patent: Jun. 30, 2009

(54) METHOD AND APPARATUS FOR RECORDING OR REPRODUCING ON OR FROM OPTICAL MEDIUM USING SBM INFORMATION

(75) Inventors: Yong Cheol Park, Gwachon-si (KR); Sung Dae Kim, Gunpo-si (KR)

(73) Assignee: LG Electronics, Inc., Seoul (KR)

( * ) Notice: Subject to any disclaimer, the term of this patent is extended or adjusted under 35 U.S.C. 154(b) by 646 days.

(21) Appl. No.: 10/744,214

(22) Filed: Dec. 23, 2003

(65) Prior Publication Data

US 2004/0174793 A1 Sep. 9, 2004

(30) Foreign Application Priority Data

Mar. 4, 2003 (KR) .................. 10-2003-0013327
Mar. 14, 2003 (KR) .................. 10-2003-0015932

(51) Int. Cl.
G11B 7/00 (2006.01)
(52) U.S. Cl. .................. 369/53.17; 369/59.25
(58) Field of Classification Search .................. None
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi et al. | |
| 4,807,205 A | 2/1989 | Picard | |
| 4,963,866 A | 10/1990 | Duncan | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |
| 5,247,494 A | 9/1993 | Ohno et al. | |
| 5,319,626 A | 6/1994 | Ozaki et al. | |

(Continued)

FOREIGN PATENT DOCUMENTS

CN 1134017 A 10/1996

(Continued)

*Primary Examiner*—Joseph Feild
*Assistant Examiner*—Joseph Haley
(74) *Attorney, Agent, or Firm*—Birch, Stewart, Kolasch & Birch, LLP

(57) ABSTRACT

A method and apparatus for recording on an optical recording medium, including the recording of management information, are described as a standard for the write-once Blu-ray disc. The management information is recorded in a management area of the disc, such as a temporary defect management area (TDMA), and includes record status information and update information. The record status information is a space bitmap (SBM) indicating whether a recording operation has been performed for a predetermined area of the disc, and the update information is SBM update information indicating whether the record status information is to be continuously managed. The SBM update information controls the state of an SBM-on/off function for each of a plurality of recording areas and may be in the form of either start position information and length information corresponding to the respective areas or an SBM update flag. The SBM update information is recorded in the TDMA and is stored in a memory of an optical disc recording/reproducing device for use during recording and reproducing operations. At the time of recording in the predetermined area, an SBM-on state enables a logical overwriting operation to be performed as necessary.

18 Claims, 6 Drawing Sheets

U.S. PATENT DOCUMENTS

| | | | |
|---|---|---|---|
| 5,404,357 A | 4/1995 | Ito et al. | |
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A * | 3/1997 | Yokogawa et al. | 369/275.1 |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi | |
| 5,805,536 A | 9/1998 | Gage et al. | |
| 5,848,038 A * | 12/1998 | Igarashi | 369/47.18 |
| 5,867,455 A | 2/1999 | Miyamoto et al. | |
| 5,878,020 A | 3/1999 | Takahashi | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A * | 10/2000 | Inokuchi et al. | 711/103 |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 * | 10/2003 | Hasegawa et al. | 386/113 |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,999,398 B2 | 2/2006 | Yamamoto et al. | |
| 7,002,882 B2 | 2/2006 | Takahashi | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 * | 12/2006 | Ogawa et al. | 714/42 |
| 7,161,879 B2 * | 1/2007 | Hwang et al. | 369/47.14 |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2001/0043800 A1 | 11/2001 | Gotoh et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |

| | | |
|---|---|---|
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2007/0294571 A1 | 12/2007 | Park et al. |
| 2008/0046780 A1 | 2/2008 | Shibuya et al. |

FOREIGN PATENT DOCUMENTS

| | | |
|---|---|---|
| EP | 0908882 A2 | 4/1999 |
| EP | 1612790 A1 | 1/2006 |
| JP | 4-172662 | 6/1992 |
| JP | 8-50766 | 2/1996 |
| JP | 11-086436 | 3/1999 |
| JP | 2005-56542 | 3/2005 |
| JP | 2005-004912 A | 6/2005 |
| WO | WO-01/95330 | 12/2001 |
| WO | WO 96/30902 A1 | 10/2003 |
| WO | WO-2004/079731 A1 | 9/2004 |
| WO | WO-2005/004154 A2 | 1/2005 |

* cited by examiner

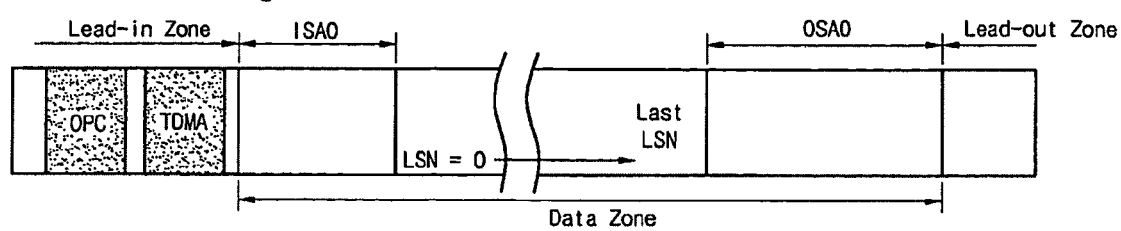
[Figure 1]
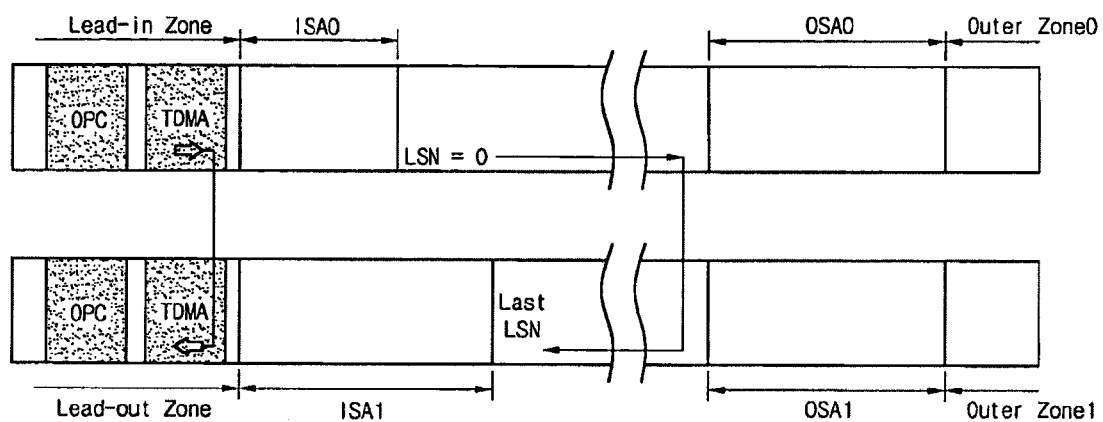
[Figure 2]

[Figure 3]
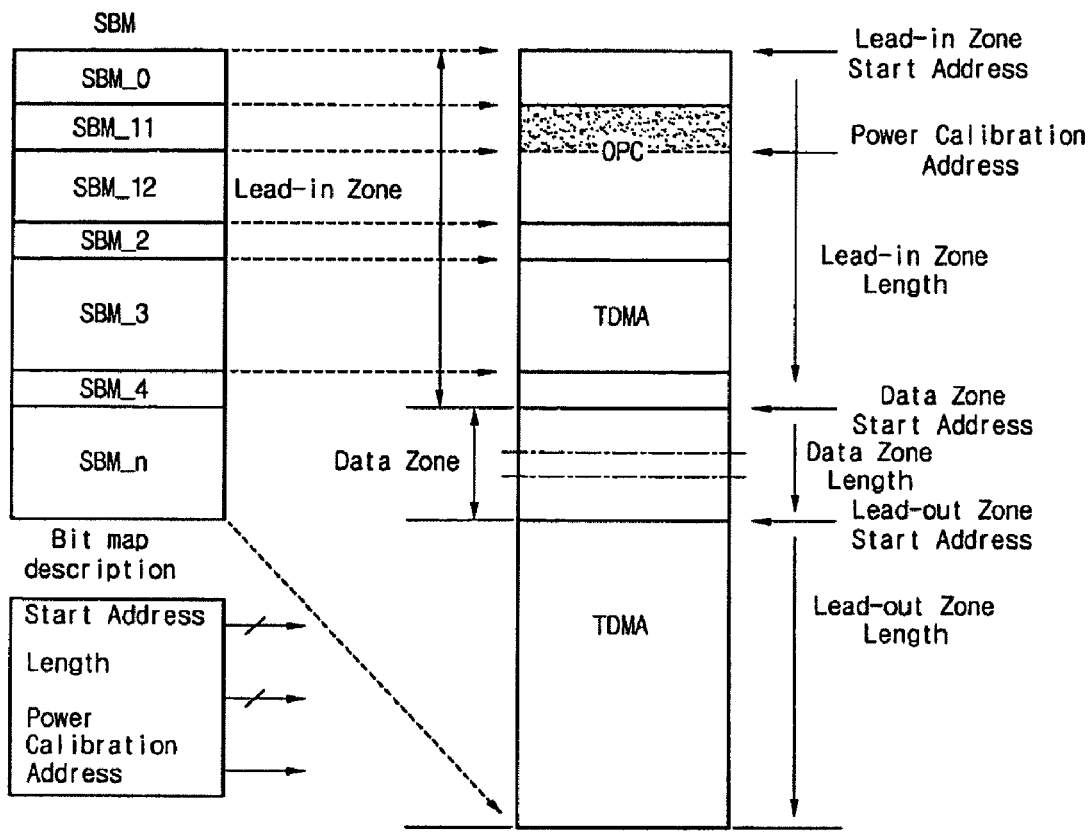
[Figure 4]
| | Contents | Number of Bytes |
|---|---|---|
| Sector 0 ~ Sector 30 | Space Bit Map | |
| | ⋮ | ⋮ |
| Sector 31 | Lead-in Zone Start Address | 4 |
| | Lead-in Zone Length | 4 |
| | Data Zone Start Address | 4 |
| | Data Zone Length | 4 |
| | Lead-out Zone Start Address | 4 |
| | Lead-out Zone Length | 4 |
| | Power Calibration Address | 4 |
| | ⋮ | ⋮ |

[Figure 5]

| | Contents | Number of Bytes |
|---|---|---|
| TDFL | TDFL | |
| TDDS | ⋮ | ⋮ |
| | Lead-in Zone Start Address | 4 |
| | Lead-in Zone Length | 4 |
| | Data Zone Start Address | 4 |
| | Data Zone Length | 4 |
| | Lead-out Zone Start Address | 4 |
| | Lead-out Zone Length | 4 |
| | Power Calibration Address | 4 |
| | ⋮ | ⋮ |

[Figure 6]

| | Contents | Number of Bytes |
|---|---|---|
| Header | ⋮ | ⋮ |
| | Lead-in Zone Start Address | 4 |
| | Lead-in Zone Length | 4 |
| | Data Zone Start Address | 4 |
| | Data Zone Length | 4 |
| | Lead-out Zone Start Address | 4 |
| | Lead-out Zone Length | 4 |
| | Power Calibration Address | 4 |
| | ⋮ | ⋮ |
| SBM | Space Bit Map | |

METHOD AND APPARATUS FOR RECORDING OR REPRODUCING ON OR FROM OPTICAL MEDIUM USING SBM INFORMATION

This application claims the benefit of Korean Applications No. 10-2003-0013327 filed on Mar. 4, 2003 and No. 10-2003-0015932 filed on Mar. 14, 2003, which are hereby incorporated by reference.

BACKGROUND OF THE INVENTION

1. Field of the Invention

The present invention relates to optical recording media, and more particularly, to a method and apparatus for recording on an optical recording medium, such as a write-once Blu-ray disc (BD-WO), in which recording on the disc in a random mode is managed by recording management information including a space bitmap (SBM) to enable a selective performance of a logical overwrite (LOW) operation.

2. Discussion of the Related Art

Data recording devices and media using optical read/write means have generally been categorized according to their writing capability or flexibility. Among read-only optical recording media, there are those using CD-ROM and DVD-ROM formats, which have no write capability. Among known disc standards that allow multiple write operations to be freely performed, there are CD-RW, DVD-RAM, DVD-RW, and DVD+RW types, which are rewritable compact discs and digital versatile discs.

WORM-type discs, on the other hand, are adopted for use as data storage devices requiring large storage capacity. Such discs, however, have limited recording flexibility and are for use in write-once read-many applications. These include CD-R and DVD-R types, which are recordable compact discs and digital versatile discs.

Meanwhile, a new type of high-density DVD, known as a Blu-ray disc, which is a large-capacity optical disc for recording high-quality audio and video data using a blue-violet laser, has been developed. The Blu-ray disc adopts a rewritable disc format known as BD-RE. Standards for the Blu-ray disc also include those for a write-once optical disc known as a BD-WO disc.

In the above types of optical recording media, surface imperfections and defects are generated during their manufacture, handling, or use. Accordingly, a method for managing the defective areas is used during a data recording operation, so that data reproduction can be carried out normally.

Referring to FIG. 1, an optical disc recording/reproducing device 100 for use with an optical recording medium 102, such as a BD-RE or BD-WO formatted disc, receives a data/command input from a host (or controller) 200. The optical disc recording/reproducing device 100 is provided with an optical pickup 104 for writing/reading data to/from an inserted optical recording medium, a pickup servo 106 for controlling the optical pickup to achieving proper tracking and to maintain a controlled distance with respect to the surface of the optical recording medium, a data processor 108 for processing data to and from the optical pickup by restoring to a desired signal value a reproduction signal received from the optical pickup or by modulating a recording signal received from the host for transfer to the disc, an interface 110 for transferring data between the host and the recording/reproducing device, a microcomputer 112 for controlling the recording/reproducing device, and a memory 114 for storing a program and for temporarily storing various information including defect management information and data. Under the control of the host 200 and stored programming, the optical pickup 104 reads data stored (or written) on a disc, providing a data signal input to the data processor 108 for reproduction processing and output, and writes data onto specified areas of the disc using a write signal output from the data processor. During a write operation, the optical disc recording/reproducing device 100 receives a data stream (or an encoded analog signal) and outputs the write signal to the optical pickup 104 in accordance with a commands input via the host 200 and the program stored in the memory 114 and executed by the microcomputer 112.

Referring to FIG. 2, showing the structure of the recording area of a disc having one recording layer, a BD-RE type disc for use with the device of FIG. 1 is divided into assigned areas. The assigned areas essentially comprise a data area set between a lead-in area (LIA) and a lead-out area (LOA). The data area includes an inner spare area (ISA) adjacent the lead-in area and an outer spare area (OSA) adjacent the lead-out area.

As above the optical disc recording/reproducing device 100 processes input data from a host 200 and writes the data onto an optical disc in clusters corresponding to an error correction code block unit. If during a write operation the existence of a defective area is detected in the data area, the optical disc recording/reproducing device 100 carries out a series of replacement write operations to write a data cluster corresponding to the detected defective area in one of the two spare areas (shown in the example of FIG. 2 as the ISA). Therefore, by writing a data cluster of a defective area in a spare area instead of the defective area, the data can be read and reproduced from the spare area, thus preventing the occurrence of writing errors even when an optical disc exhibits defects in the data area and thereby assuring data security and data integrity.

In addition to writing the data clusters of defective areas, position information is recorded as defect management information in a plurality of defect management areas or DMAs, including DMA1 and DMA2 provided in the lead-in area and DMA3 and DMA4 provided in the lead-out area. The position information includes cluster location information relating to a defective area, its replacement area, and the like and enables the defective areas to be managed during a recording or reproducing stage.

In the case of a BD-RE disc, since rewriting is possible in any recording area of the disc, the entire disc can be freely used irrespective of recording mode. Thus, disc management in a BD-RE disc is relatively unproblematic. Meanwhile, BD-WO disc has no rewrite capability, so disc management presents a greater challenge since data recording may be performed only once in any specified area of the disc.

In any event, the management of defective areas is crucial during data recording, particularly for high-density DVDs such as the Blu-ray disc, but current BD-WO standards are inadequate, a problem that is compounded as multiple recording layers are employed. A unified standard, one that can accommodate the progressive demands of commercial systems for optical data storage, is required.

SUMMARY OF THE INVENTION

Accordingly, the present invention is directed to a method for recording on an optical recording medium, and an apparatus using the same, that substantially obviate one or more of the problems due to limitations and disadvantages of the related art.

An object of the present invention, which has been devised to solve the foregoing problem, lies in providing a method and apparatus for recording on an optical recording medium, such as a BD-WO disc, by which record status information of the disc can be recorded and managed in a random recording mode and by which a determination can be made as to performance of logical overwriting in accordance with the disc's record status.

It is another object of the present invention to provide a unified standard for write-once optical recording media.

It is another object of the present invention to provide such a standard compatible with rewritable optical recording media.

It is another object of the present invention to provide a more efficient method for the management of defective areas during data recording on a write-once optical recording medium.

It is another object of the present invention to provide a method for recording on an optical recording medium in which data security and data integrity is enhanced.

It is another object of the present invention to provide a method for recording management information on an optical recording medium, which is suitable for a disc having predetermined recording areas across multiple recording layers.

It is another object of the present invention to provide a method for recording management information on an optical recording medium, which can be adaptively applied according requests from a host.

It is another object of the present invention to provide a method for recording management information on an optical recording medium, which enables adaptation to successive versions of the medium.

It is another object of the present invention to provide an optical recording medium for adopting the above methods.

It is another object of the present invention to provide an apparatus suitable for the above optical recording medium.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method for recording on an optical recording medium, the method comprising a step of recording management information in a management area of the optical recording medium, the management information including record status information indicating whether a recording operation has been performed for a predetermined area of the optical recording medium, and update information indicating whether the record status information is to be continuously managed.

In another aspect of the present invention, there is provided a method for recording on an optical recording medium, the method comprising steps of: recording management information in a management area of the optical recording medium, the management information including record status information indicating a recorded/non-recorded status for a predetermined area of the optical recording medium, and update information indicating whether the record status information is to be continuously managed; reading the recorded management information; and determining, based on the update information, whether to update the record status information.

In another aspect of the present invention, there is provided a method for recording on an optical recording medium, the method comprising steps of: recording management information in a management area of the optical recording medium, the management information including record status information indicating a recorded/non-recorded status for a predetermined area of the optical recording medium; and performing a logical overwrite operation when the record status information indicates a recorded status for the predetermined area.

In another aspect of the present invention, there is provided an apparatus for recording on and reproducing from an optical recording medium, comprising: a host for requesting recording data on a predetermined area of a data area of the recording medium; and a recording/reproducing device for processing management information of the recording medium, the management information including information indicating a recorded-non/recorded status of the predetermined area, wherein said recording/reproducing device determines a record status of the predetermined area based on the record status information and determines whether the record status information is to be updated, to perform a replacement-recording operation to record the data of the predetermined area elsewhere in the data area if it is determined that the predetermined area is a recorded area and that the record status information is to be updated.

In another aspect of the present invention, there is provided an optical recording medium, comprising: at least one recording layer having a plurality of assigned areas for recording, the assigned areas including a management area, wherein management information is recorded in the management area, the management information including record status information indicating whether a recording operation has been performed for a predetermined area of the optical recording medium, and update information indicating whether the record status information is to be continuously managed.

The following detailed description is made particularly with respect to a write-once Blu-ray disc. Nevertheless, other write-once type optical recording media may adopt the method and apparatus of the present invention. In addition, though most suited for optical discs using the BD-WO format, the fundamental principles of the present invention may be adopted by optical discs using other formats, including rewritable formats, for enhanced data security and data integrity.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of an optical disc recording/reproducing system of a related art;

FIG. 2 is a diagram illustrating a method for managing a defective area of a rewritable optical recording medium, such as a BD-RE disc, for use in the system of FIG. 1;

FIG. 3 is a diagram of a write-once optical recording medium, such as a BD-WO disc, illustrating a method of recording management information according to the present invention;

FIG. 4 is a diagram of sample recording stages of a TDFL of FIG. 3;

FIG. 5 is a diagram of an SBM of FIG. 3;

FIG. 6 is a diagram of a sample set of SBM update flags included in a TDDS of FIG. 3;

DETAILED DESCRIPTION OF THE PREFERRED EMBODIMENTS

Figure 7:
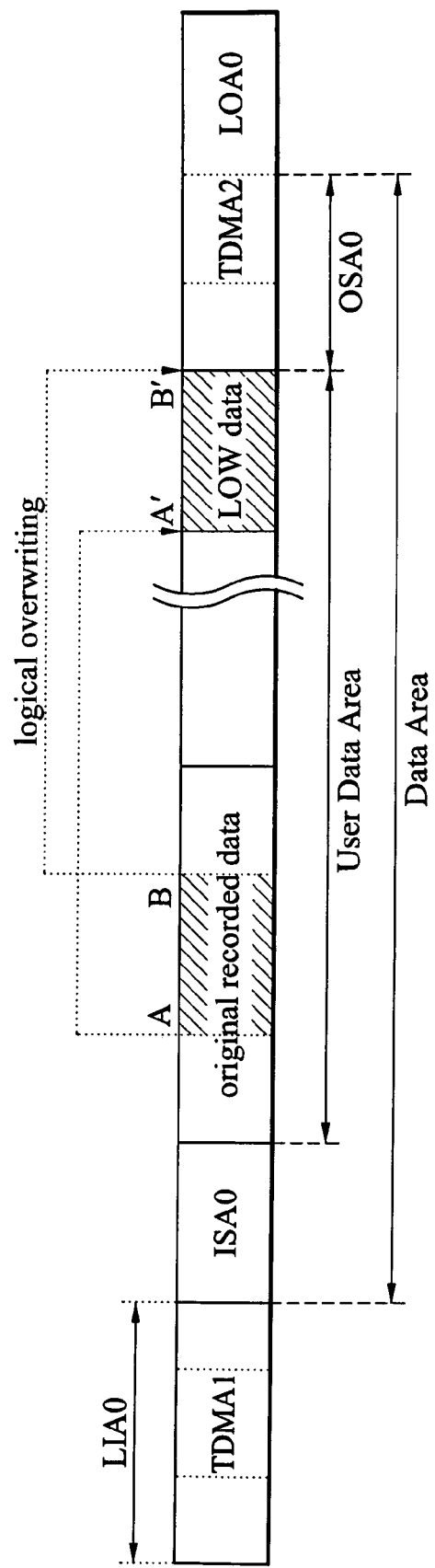
FIG. 7 is a diagram illustrating one mode of operation in recording on an optical recording medium, for explaining the relationship between the SBM-on/off function and the performance of logical overwriting according to the present invention.

Reference will now be made in detail to the preferred embodiments of the present invention, examples of which are illustrated in the accompanying drawings. Throughout the drawings, like elements are indicated using the same or similar reference designations.

Generally speaking, an overwrite operation is a repeated recording in a specified area of a rewritable recording medium, and as such, is an inherent characteristic of the rewritable optical disc. In the case of a write-once type disc, however, if an already recorded area exists in the data area, it is physically impossible to perform an overwrite function on the area due to the inherent characteristics of such a disc. Therefore, the present invention makes use of logical overwriting (LOW), in distinction from "physical" overwriting. That is, upon determining a status of use (i.e., recorded or non-recorded) of each of a plurality of assigned areas of the disc, the logical overwriting according to the present invention is performed for a specified area of the disc, as necessary. In doing so, the inherent characteristics of a write-once optical disc are observed. The status of use of a disc adopting the fundamental principles of the present invention is determined based on a space bitmap (SBM) stored in a temporary defect management area (TDMA).

Terminology used in the following description of the present invention is based in part on conventional usage in the known field of DVD technology and is in part a result of an adaptation to novel principles of the present invention. For example, the above SBM includes bitmap data corresponding to each of a plurality of assigned areas of an optical recording medium, including at least one bit for each cluster of the recording area. The present invention also adopts an SBM-on/off function, whereby continuous management (updating) of the SBM is enabled or disabled for an instance of recording on a specified area of the disc, according to a user operation, the manufacturer's design, or a host command. The status of the SBM-on/off function is determined for each assigned area of the disc based on SBM update information, which controls SBM-updating for the corresponding area. The update information is determined according to first and second embodiments of the present invention.

Referring to FIG. 3, illustrating a write-once optical disc having a single recording layer, a BD-WO disc adopting the method of the present invention includes in addition to the areas of a BD-RE disc a TDMA comprised of a TDMA1 arranged in an inner spare area (ISA0) and a TDMA2 arranged in an outer spare area (OSA0). In the BD-WO according to the present invention, replacement data corresponding to a defective area is recorded in the ISA0 and/or OSA0, following the same procedure as defect management performed in the BD-RE disc. Disc management information, on the other hand, is recorded in the TDMA. Here, disc management information is information related to managing the defective area together with other management information necessary for implementing the present invention, namely, SBM update information.

A defect management area (DMA) typically includes a plurality of areas for each recording layer, for example, DMA1, DMA2, DMA3, and DMA4. Upon completion of any recording stage using a write-once type optical disc, final values of the TDMA information must be transferred to, and recorded in, the DMA. Thus, the TDMA is a temporary DMA.

In the case of a rewritable optical disc, data can be repeatedly written in and erased from the DMA, so that adequate disc management is achievable with a relatively small recording area reserved for the DMA. In the case of a write-once type optical disc, however, as soon as data is recorded in an area, the area's recording ability is in effect destroyed and the same area can never be used again for any other data. Hence, a management area of a larger size is required for write-once type discs.

The TDMA1 of the disc shown in FIG. 3 has a fixed size within the LIA0, while the TDMA2 has a size relative to the size of the LOA0. For example, the TDMA2 may be comprised of m clusters, where $m=(k \times 256)/4$ and where $1 \leq k \leq 64$ for a single layer disc.

Disc management information is recorded as necessary in each of the above TDMAs in a recording unit defined as one cluster comprised of 32 sectors. The disc management information according to the present invention includes a temporary defect list (TDFL), a space bitmap (SBM) determining a record status of the disc, and a temporary disc definition structure (TDDS) updated for each instance of recording. The TDDS information is prepared cluster by cluster, which is the minimum recording unit, and is recorded together with each update of the TDFL or SBM, to include information related to a recording status in addition to general disc management information. Thus, a TDFL and TDDS pair or an SBM and TDDS pair is recorded in the TDMA for each update, such that a plurality of such pairs may be recorded as necessary, each TDFL and TDDS pair occupying j clusters and each SBM and TDDS pair occupying one cluster, with the TDDS making up the last sector of either pair. In doing so, updated TDDS information can be confirmed by reading one end of the recorded area in the TDMA. Here, it should be appreciated that the same facilitated TDDS confirmation could be achieved by placing the TDDS in sector 0.

FIG. 4 illustrates the method of recording a TDFL of FIG. 3 according to the present invention. The TDFL is a list of information for managing a series of steps for substituting (replacement-recording) a defective area of the data area with the spare area and, in the case of a single layer, occupies one to four clusters ($1 \leq j \leq 4$) depending on the size of the defect list.

Referring to FIG. 4, each instance of updating the TDFL results in another TDFL and TDDS pair being recorded in the TDMA. Here, assuming for example a recording of two defect entries (Defect Entry 1 and Defect Entry 2) during a first updating, a second updating to add a third defect entry would produce a TDFL having the third defect entry recorded in addition to the previous two, resulting in a TDFL consisting of Defect Entries 1, 2, and 3. In the same manner, the next TDFL results from the performance of a third updating, to record an updated TDFL consisting of Defect Entries 1, 2, 3, and 4. By cumulatively recording the defect entries in this manner, the entire list of defect entries for the whole disc can be confirmed by confirming the latest TDFL, thereby simplifying record operations. Thus, as long as the final TDFL remains effective, defect entries may be securely confirmed even if a defect has occurred in one or more of the previously recorded TDFLs, for example, in the firstly or secondly updated TDFL.

The SBM of FIG. 3 is used in determining a status of use of the disc and contains information applicable to the entire recording area of the disc. One bit of the SBM is allocated for each cluster to express whether the corresponding cluster is a recorded area or a non-recorded area. Thus, the recorded area may be determined by a bit value of "1$b$" and a non-recorded area may be determined by a bit value of "0$b$," or vice versa. Accordingly, by reading the SBM, the recorded areas and non-recorded areas of the whole disc can be recognized.

That is, the method of the present invention enables the recorded area or areas and the non-recorded area or areas to be recognized by a simple reading of the SBM and enables the record status of each area of the disc to be determined regardless of the sequence of recording, that is, even when recording is performed in non-sequential manner as in a random recording mode. Therefore, if information is to be freely recorded on a write-once optical disc, SBM management is necessary.

Referring to FIG. 5, the SBM is composed of three main fields, including a header enabling recognition of the SBM, data describing the SBM itself, and a terminator designating an end of the SBM. The header includes recording layer information nominating the recording layer, i.e., L0 or L1, so that the current SBM of every area of a multiple layer disc can be designated. The SBM is prepared (i.e., recorded) according to each area of the disc, whether a single layer disc or a multiple layer disc, and includes start position information, i.e., the first physical sector number of the start cluster, length information, bitmap data, and a reserved field. Thus, the TDDS is updated whenever there is a change to the record status of a specified area per recording layer and whenever the desired recording calls for updating importantly, a determination as to whether the SBM is to be updated for a given area can be performed as needed by a user, a disc manufacturer, or a host/controller (hereinafter referred to as the host).

According to a first preferred embodiment of the present invention, the status of the SBM-on/off function is determined by the SBM information, which is comprised of the start position information and the length information of a given area of the disc. An SBM-on condition for an area enables SBM-updating for the area. Here, SBM-updating is performed using the area's bitmap data, which is applied according to the stored values of the start position and length of the corresponding area. To set the SBM-on/off function to "off" and thereby disable SBM-updating in an area, the start position information and length information of the area are set to a specified value, e.g., set to zero.

As above, the SBM-on/off functions according to the present invention quickly adapts to a diverse range of requests of the host. For example, if real-time recording on a BD-WO disc is desired, defect management is not performed. Thus, the spare area is not used for replacement-recording, and SBM-updating of the spare area is not required. In such a case, only the user data area would be continuously managed, with no SBM-updating being performed in any other area. Here, it should be appreciated that, if the SBM were to be updated whenever there was a change in the disc management information in the management area (non-user data area), which is frequent, continued SBM-updating would soon be impossible due to the limited size of the SBM recording area, which is located in the TDMA in a preferred embodiment of the present invention. In turn, with a discontinuation of SBM-updating, further management of the record status using the SBM information would become impossible in all areas, including the user data area. Therefore, since the user data area absolutely requires a current SBM to perform logical overwriting, it is preferable to exclude areas such as the management area from SBM-updating operations so that updating may be reserved for the user data area. To implement such a recording scheme according to the host command, the SBM-on/off function may be used to perform the SBM-updating of the user data area only, whereby SBM-updating is disabled for all other areas (i.e., areas other than those to be updated) by setting to zero the start position information and the length information of each area that is not to be updated. It should be well appreciated that the present invention is not limited to any one example of applying the SBM-on/off function according to assigned areas of a disc, such as the above example, and that the SBM-on/off function of the present invention is adaptively selectable, to enable the system designer to program any desired combination of SBM-on states versus SBM-off states according to a predetermined assignment of disc areas.

According to a second preferred embodiment of the present invention, the status of the SBM-on/off function is determined by a set of SBM update flags recorded in the TDDS, with one SBM update flag allotted for each assigned area of a disc. The SBM update flags may be applied in association with the start position information and length information for each area (per the first embodiment) or may be applied independently. The SBM update flags may be represented by one byte so that, in a dual layer disc divided into eight areas, one bit may be allocated to each area. Thus, one of two values would be assigned to each area to indicate the status of the area, i.e., whether or not the area is to be updated.

Referring to FIG. 6, which is an example of the SBM update flags of the TDDS, a "0$b$" value is recorded in areas to be updated continuously, and a "1$b$" value is recorded in areas where no updating is to be performed. Thus, in a dual layer optical disc, supposing that a host commands SBM-updating for the user data areas only, the recording of the respective SBM update flags enables (sets to "on") updating for the user data areas and disables (sets to "off") updating for the remaining areas. Specifically, flag bits b2 and b5 are both "on" and flag bits b0, b1, b3, b4, b6, and b7 are all "off." When an optical disc having the above SBM update flag information is loaded into an optical disc recording/reproducing device, the flags are read to determine whether to update the SBM of a specified area of the disc.

In addition to a set of SBM update flags as above, the recorded disc management information contained in a TDDS of FIG. 3 also includes the first physical sector numbers of each of the latest TDFL and the latest SBM. The first physical sector numbers of the latest TDFL and SBM are included so that their respective positions can be ascertained by reading the TDDS, to detect currently known defective areas and a status of use of the disc. Here, the first physical sector number is the address of the leading sector in the corresponding cluster and typically occupies four bytes, and the latest TDFL or SBM is that containing the most recently updated information.

The disc management information recorded in the TDDS further includes the first physical sector number of a usable (available) cluster for optimum power calibration (OPC), which is used by the optical disc recording/reproducing device to perform a test write and read operation to determine the most efficient laser power setting for recording, and as such, is always needed. Therefore, the first physical sector number of a usable OPC cluster is included, irrespective of the status (on or off) of the SBM-updating, to accommodate cases where SBM-updating is enabled for the user data area only, in which case the OPC cluster, being located outside the user data area (e.g., in the LIA0), would be excluded from SBM-updating. By always recording this information in the TDDS, the OPC cluster can be accessed whenever necessary, even if SBM-updating is disabled for the corresponding area.

Figure 8:
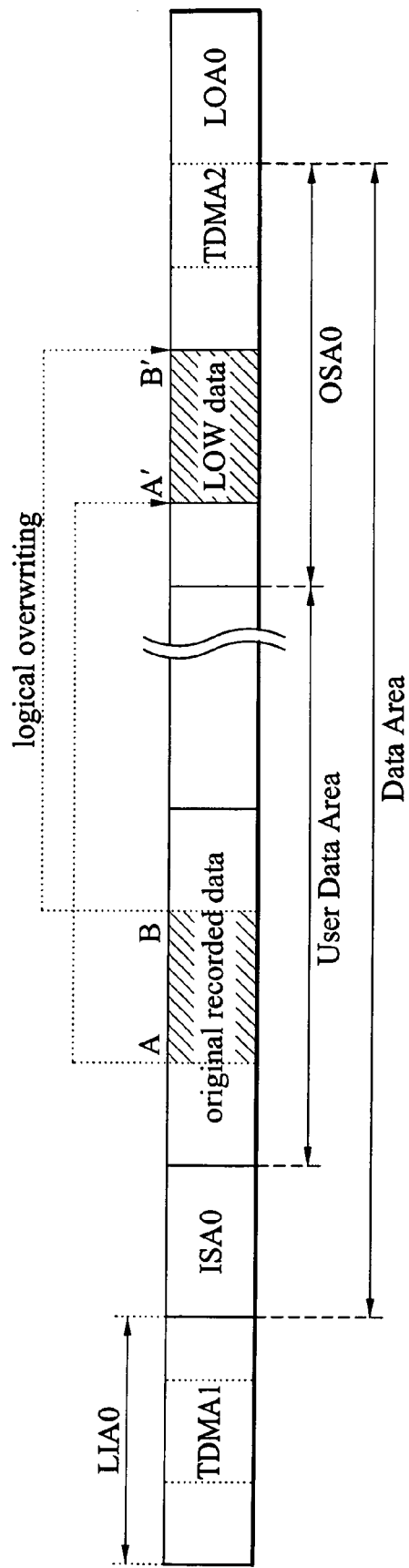
FIG. 8 is a diagram illustrating another mode of operation in recording on an optical recording medium, for explaining the relationship between the SBM-on/off function and the performance of logical overwriting according to the present invention.

FIGS. 7 and 8 respectively illustrate modes of operation in recording on a write-once optical recording medium, such as a BD-WO disc, for explaining the relationship between the SBM-on/off function and the performance of logical overwriting according to the present invention. Here, the example of FIG. 7 considers a disc format in which the size of the spare area is fixed regardless of recording operations, while the example of FIG. 8 considers a disc format in which the size of the spare area is adaptable according to data recording operations.

If a recording command from the host requests data recording on an area A-B as shown in FIGS. 7 and 8, which is an already recorded area, a replacement recording operation for the data is needed, whereby the desired data is recorded in an alternative area within the data area, i.e., in a replacement area A'-B', using a logical overwrite operation according to the present invention. Thus, the host can command the recording irrespective of whether the specified area of the disc is actually recorded already, even in the case of a write-once optical disc, so that the write-once optical disc can, through logical overwriting, simulate the capabilities of a rewritable optical disc.

In carrying out the recording command on the already recorded area A-B as above, the first step is a reading of the SBM to confirm that the area's status of use, i.e., already recorded. If "overwriting" is requested, the data is replacement-recorded within the data area in the replacement area A'-B', and the corresponding defect management information is recorded in the TDMA as the TDFL information, to complete the desired recording command. Accordingly, if the host desires a reproduction of the A-B data of a disc recorded as above, the optical disc recording/reproducing device refers to the recorded defect management information and reproduces the data stored in area A'-B' instead of the data stored in area A-B.

Before performing a logical overwrite operation using the method of the present invention, the current record status in the corresponding area of the disc must be accurately determined. That is, logical overwriting is impossible without continuously updated disc management information, i.e., a current SBM.

One mode of operation, corresponding to the example of FIG. 7, is summarized in Table 1.

TABLE 1

| conditions | | results | |
|---|---|---|---|
| SBM-on/off function | spare area assignment | logical overwriting | defect management |
| on* | yes | yes* | yes |
| on* | no | yes* | no |
| off | yes | no | yes |
| off | no | no | no |

As shown in Table 1, the logical overwriting can be performed only when the SBM update flag is in an "on" state, so as to be continuously updated. The "logical overwrite" replacement-recorded data, i.e., the LOW data, is therefore recorded in the user data area, preferably at the end of the user data area. Here, the availability ("yes" or "no") of an assigned spare area determines whether defect management is permitted, but the SBM update flag ("on" or "off") determines whether logical overwriting is permitted.

Another mode of operation, corresponding to the example of FIG. 8, is summarized in Table 2.

TABLE 2

| conditions | | results | |
|---|---|---|---|
| SBM-on/off function | spare area assignment | logical overwriting | defect management |
| on* | yes* | yes* | yes |
| on | no | no | no |
| off | yes | no | yes |
| off | no | no | no |

As shown in Table 2, logical overwriting can be performed only when both conditions are met, i.e., with SBM-on/off function enabled, i.e., set to "on" so as to be continuously updated, and an assigned spare area is available. Thus, the spare area is used for the LOW data as well as for recording a replacement cluster during defect management of the disc. Here, record status is confirmed only when the SBM-on/off function is "on," and logical overwriting is performed only when an assigned spare area exists.

Figure 9:
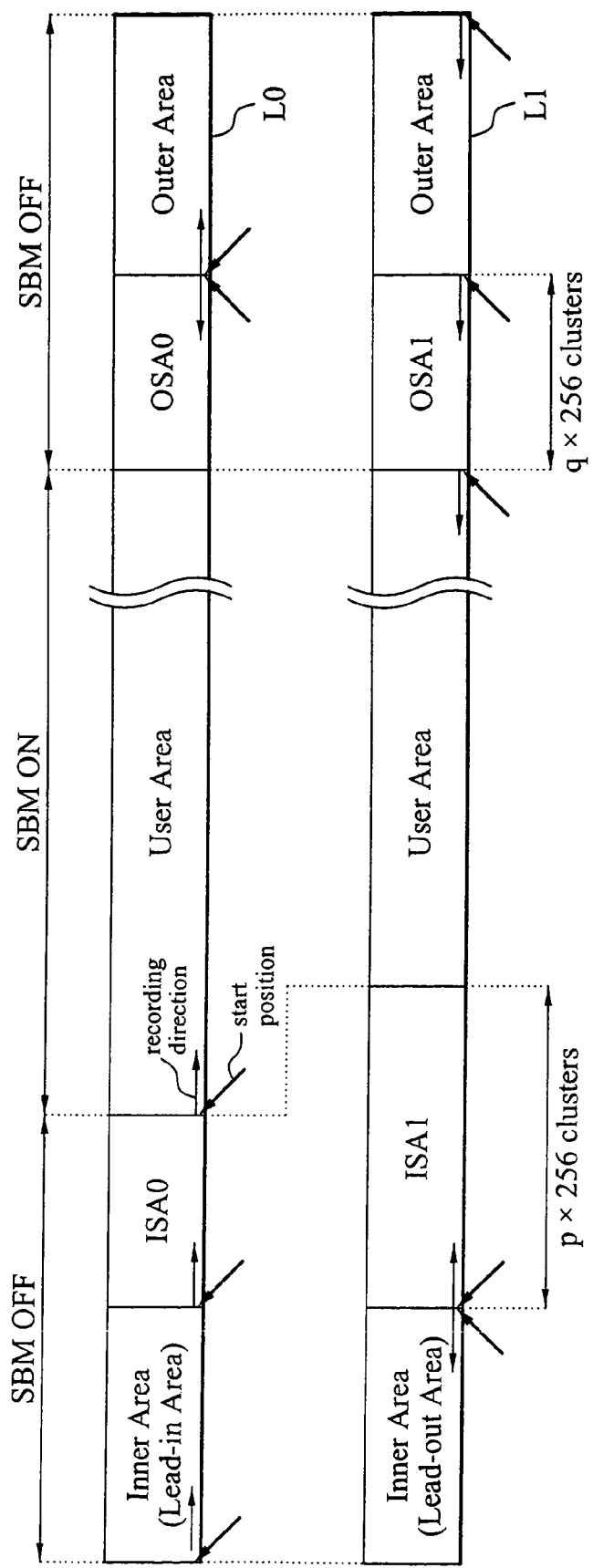
FIG. 9 is a diagram of an optical recording medium having multiple recording layers according to the present invention.

FIG. 9 illustrates the SBM-on/off function according to a preferred embodiment of the present invention. The SBM-on/off function is determined with respect to each of a plurality of assigned areas of an optical disc having plurality of recording layers L0 and L1, each of which includes an inner area, an inner spare area, a user area, an outer spare area, and an outer area. In the case of a dual-layer disc as above, the inner area of the first recording layer L0 becomes the lead-in area, and the inner area of the second recording layer L1 becomes the lead-out area. This is in contrast to the case of a single-layer disc, whose outer area is defined as the lead-out area. In one configuration of a BD-WO disc as above, the ISA1 has a size of p×256 clusters, where $1 \leq p \leq 64$, and the OSA1 has a size of q×256 clusters, where $1 \leq q \leq 2$.

The start position and recording direction of each area are shown for a preferred scheme offering efficient recording. It should be noted, however, that the start position of each area is determined according to its recording direction and that changing the recording direction of any area would change the start position of the area accordingly.

In an apparatus using the method of the present invention, such as the optical disc recording/reproducing device 100 shown in FIG. 1, when an optical recording medium such as a BD-WO disc is inserted into the device, all of the existing disc management information is first read out and stored in the memory 114 for use during the disc's recording and/or reproducing operations. Thus, the SBM and SBM update flag are included in the stored disc management information. With a command from the host 200 to record data in a specified area of the disc, the area's positional information, i.e., the start position and length information, is input to the optical disc recording/reproducing device 100 along with the data to be recorded. The microcomputer 112 receives the recording command, and according to the positional information, determines whether the area to undergo recording is a recorded area or a non-recorded area based on the disc management information stored in the memory 114. The microcomputer 112 then determines whether to update the SBM of the specified area based on the area's record status. If the area is one where the SBM-on/off function is "on" and has an already recorded status, replacement-recording for a defective area would be performed elsewhere in the data area, as in FIGS. 7 and 8, and then the SBM is updated.

In the case of FIG. 8, however, replacement-recording is performed in the spare area of the data area. Therefore, with the SBM-on/off function state to "on" for the user data area only, i.e., the spare area is in an SBM-off state, there is no SBM-updating performed in the spare area.

It should be noted that one or the other or both of the SBM information (specifically, the start position information and length information) and the SBM update flag may be stored in the memory 114 of the above apparatus according to the present invention, to be accessed and used during operation as necessary. In doing so, the method according to each of the first and second embodiments can be implemented, either separately or jointly, as desired.

As described above, by adopting the method and apparatus of the present invention, record status information of an optical recording medium such as a dual layer BD-WO disc can be recorded and managed in a random recording mode and then a determination can be made as to performance of logical overwriting in accordance with the disc's record status. The disclosure of the present invention can be used as a unified standard for write-once optical recording media, which is even compatible with rewritable optical recording media, to provide a more efficient method for the management of defective areas during data recording on a write-once optical recording medium and thereby provide enhanced data security and data integrity. The SBM-on/off function with respect to each area of an optical disc can be selectively applied in response to any request from a host. Moreover, by adopting the present invention, a write-once disc can simulate the characteristics of a rewriteable disc through a logical overwrite operation, whereby the data of a defective area is replacement-recorded. The replacement-recording is performed in either the management area or the user data area, to enable adaptation to successive versions of the medium.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for recording data on an optical recording medium including a user data area and a non-user data area, the non-user data area including a temporary defect management area (TDMA) and a final defect management area (DMA), the method comprising steps of:
    recording management information in the TDMA of the optical recording medium, the management information including
        bitmap data indicating whether or not each recording unit of the user data area is a recorded area, and
        start position information indicating a start address of the user data area to which the bitmap data is applied,
    wherein the bitmap data includes a bitmap allocating only one bit to each recording unit; and
    transferring the management information from the TDMA to the DMA at finalization of the optical recording medium.

2. The method as claimed in claim 1, wherein the optical recording medium is a write-once optical recording medium.

3. The method as claimed in claim 1, wherein the recording unit is a cluster and the bitmap data contains one bit for every cluster of the user data area.

4. The method as claimed in claim 1, wherein the management information further includes information indicating whether a bitmap data exists for the non-user data area of the recording medium.

5. The method as claimed in claim 1, wherein the management information further includes position information of a first usable area for performing optical power calibration.

6. The method as claimed in claim 1, wherein the management information further includes layer information indicating a layer number to which the bitmap data is applied.

7. The method as claimed in claim 1, wherein the management information further includes start address information of the bitmap data.

8. An apparatus for recording data on an optical recording medium including a user data area and a non-user data area, the non-user data area including a temporary defect management area (TDMA) and a final defect management area (DMA), the apparatus comprising:
    a recording device configured to record management information in the TDMA of the optical recording medium,
    wherein the management information includes bitmap data indicating whether or not each recording unit of the user data area is a recorded area, and start position information indicating a start address of the user data area to which the bitmap data is applied, and
    wherein the bitmap data includes a bitmap allocating only one bit to each recording unit;
    the recording device further configured to transfer the management information from the TDMA to the DMA at finalization of the optical recording medium.

9. The apparatus as claimed in claim 8, wherein the management information further includes layer information indicating a layer number to which the bitmap data is applied.

10. The apparatus as claimed in claim 8, wherein the management information further includes start address information of the bitmap data.

11. The apparatus as claimed in claim 8, wherein the recording unit is a cluster and the bitmap data contains one bit for every cluster of the user data area.

12. An apparatus for reproducing data from an optical recording medium including a user data area and a non-user data area, the non-user data area including a temporary defect management area (TDMA) and a final defect management area (DMA), the apparatus comprising:
    a reproducing device configured to reproduce management information, which has been transferred from the TDMA to the DMA at finalization of the optical recording medium, from the DMA of the optical recording medium,
    wherein the management information includes bitmap data indicating whether or not each recording unit of the user data area is a recorded area, and start position information indicating a start address of the user data area to which the bitmap data is applied, and
    wherein the bitmap data includes a bitmap allocating only one bit to each recording unit.

13. The apparatus as claimed in claim 12, wherein the management information further includes layer information indicating a layer number to which the bitmap data is applied.

14. The apparatus as claimed in claim 12, wherein the management information further includes start address information of the bitmap data.

15. The apparatus as claimed in claim 12, wherein the recording unit is a cluster and the bitmap data contains one bit for every cluster of the user data area.

16. The method as claimed in claim 1, wherein the TDMA is located in a lead-in area or a spare area of the optical recording medium.

17. The apparatus as claimed in claim 8, wherein the TDMA is located in a lead-in area or a spare area of the optical recording medium.

18. The apparatus as claimed in claim 12, wherein the TDMA is located in a lead-in area or a spare area of the optical recording medium.

* * * * *